(12) United States Patent
Nakamaru

(10) Patent No.: US 8,770,869 B2
(45) Date of Patent: Jul. 8, 2014

(54) IMAGE FORMING APPARATUS, PAPER MANAGEMENT METHOD AND COMPUTER-READABLE MEDIUM

(75) Inventor: Akihiko Nakamaru, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 619 days.

(21) Appl. No.: 12/721,588

(22) Filed: Mar. 11, 2010

(65) Prior Publication Data

US 2010/0245876 A1 Sep. 30, 2010

Related U.S. Application Data

(63) Continuation-in-part of application No. 12/548,775, filed on Aug. 27, 2009, now abandoned.

(30) Foreign Application Priority Data

Mar. 26, 2009 (JP) ................................ 2009-076057
Nov. 10, 2009 (JP) ................................ 2009-257177

(51) Int. Cl.
*B41J 29/38* (2006.01)
*B41J 15/00* (2006.01)

(52) U.S. Cl.
CPC . *B41J 29/38* (2013.01); *B41J 15/00* (2013.01)
USPC ............................. 400/76; 400/613; 358/1.15

(58) Field of Classification Search
USPC .................................................. 400/76, 613
See application file for complete search history.

(56) References Cited

U.S. PATENT DOCUMENTS

| 6,672,214 B1* | 1/2004 | Bartholet et al. ............. 101/485 |
| 2006/0039707 A1 | 2/2006 | Mima |
| 2008/0232886 A1 | 9/2008 | Kato et al. |
| 2012/0044535 A1* | 2/2012 | Samii et al. .................. 358/1.15 |

FOREIGN PATENT DOCUMENTS

| CN | 1737700 A | | 2/2006 | |
| CN | 101271532 A | | 9/2008 | |
| JP | 5-58387 U | | 8/1993 | |
| JP | 5-221102 A | | 8/1993 | |
| JP | 07-108739 A | | 4/1995 | |
| JP | 2001-105700 A | | 4/2001 | |
| JP | 2001106406 A | * | 4/2001 | ............ B65H 26/06 |
| JP | 2002-284439 A | | 10/2002 | |

(Continued)

OTHER PUBLICATIONS

Communication dated Apr. 9, 2013 from the State Intellectual Property Office of P.R. China in a counterpart application No. 200910177892.1.

(Continued)

*Primary Examiner* — Daniel J Colilla
(74) *Attorney, Agent, or Firm* — Sughrue Mion, PLLC

(57) ABSTRACT

An image forming apparatus includes: a storage unit that stores an identifier and a remaining sheet length of a roll sheet after an image formation has been finished; a specifying unit that specifies sheet lengths of pages where images are to be formed based on an image forming instruction, and a number of the pages; a computing unit that calculates a sheet length required for an image formation in accordance with the image forming instruction based on the specified sheet lengths and the specified number of the pages; and a selection unit that selects a roll sheet for the image formation in accordance with the image forming instruction based on the calculated sheet length and the stored remaining sheet length.

3 Claims, 18 Drawing Sheets

(56) References Cited

FOREIGN PATENT DOCUMENTS

| | | | | | |
|---|---|---|---|---|---|
| JP | 2002-356031 | A | | 12/2002 | |
| JP | 2003-300362 | A | | 10/2003 | |
| JP | 2003300362 | A | * | 10/2003 | ............... B41J 29/38 |
| JP | 2004-167932 | A | | 6/2004 | |
| JP | 2004-209808 | A | | 7/2004 | |
| JP | 2005-157460 | A | | 6/2005 | |
| JP | 2005-169918 | A | | 6/2005 | |
| JP | 2005169918 | A | * | 6/2005 | ............... B41J 29/38 |
| JP | 2005271354 | A | * | 10/2005 | ............... B41J 15/04 |
| JP | 2006-127500 | A | | 5/2006 | |
| JP | 2006-256097 | A | | 9/2006 | |
| JP | 2006-327066 | A | | 12/2006 | |
| JP | 2007276335 | A | * | 10/2007 | ............... B41J 29/38 |
| WO | WO 2010107438 | A1 | * | 9/2010 | |

OTHER PUBLICATIONS

Communication dated Mar. 25, 2013 from the Korean Intellectual Property Office in a counterpart application No. 10-2009-0086272.
Notification of Reasons for Refusal, dated for Jul. 17, 2013, issued by the Japanese Patent Office in counterpart Japanese Application No. 2009-257177.

* cited by examiner

FIG. 8A

| IS PRINTING CONTINUED ON SHEET AAAA? |
|---|

FIG. 8B

| SET SHEET BBBB. |
|---|

FIG. 8C

| SHEET IDENTIFIER: AAAA | | | REMAINING SHEET LENGTH: 1,000m | |
|---|---|---|---|---|
| JOB NO. | JOB NAME | STATUS | NUMBER OF PAGES | USE SHEET LENGTH [m] |
| 001 | JOB0001 | WAITING | 3000 | 33000 |
| 002 | JOB0002 | WAITING | ---- | ---- |
| 003 | JOB0003 | WAITING | ---- | ---- |
| ---- | ---- | ---- | ---- | ---- |

FIG. 8D

| SHEET IDENTIFIER: BBBB | | | REMAINING SHEET LENGTH: 50,000m | |
|---|---|---|---|---|
| JOB NO. | JOB NAME | STATUS | NUMBER OF PAGES | USE SHEET LENGTH [m] |
| 001 | JOB0001 | PRINTING | 3000 | 33000 |
| 002 | JOB0002 | WAITING | ---- | ---- |
| 003 | JOB0003 | WAITING | ---- | ---- |
| ---- | ---- | ---- | ---- | ---- |

FIG. 11A

| SHEET IDENTIFIER: AAAA | | REMAINING SHEET LENGTH: 1,000m | | |
|---|---|---|---|---|
| JOB NO. | JOB NAME | STATUS | NUMBER OF PAGES | USE SHEET LENGTH [m] |
| 001 | JOB0001 | WAITING | ... | ... |
| 002 | JOB0002 | WAITING | ... | ... |
| 003 | JOB0003 | WAITING | ... | ... |
| : | : | : | : | : |

FIG. 11B

| SHEET IDENTIFIER: AAAA | | REMAINING SHEET LENGTH: 1,000m | | |
|---|---|---|---|---|
| JOB NO. | JOB NAME | STATUS | NUMBER OF PAGES | USE SHEET LENGTH [m] |
| 001 | JOB0001 | WAITING | ... | ... |
| 002 | JOB0002 | WAITING | ... | ... |
| 003 | JOB0003 | WAITING | ... | ... |
| : | : | : | : | : |

FIG. 11C

| SHEET IDENTIFIER: BBBB | | REMAINING SHEET LENGTH: 50,000m | | |
|---|---|---|---|---|
| JOB NO. | JOB NAME | STATUS | NUMBER OF PAGES | USE SHEET LENGTH [m] |
| 001 | JOB0001 | PRINTING | 3,000 | 33,000 |
| 002 | JOB0002 | WAITING | ... | ... |
| 003 | JOB0003 | WAITING | 100 | 1,100 |
| : | : | : | : | : |

FIG. 14

| SHEET IDENTIFIER: AAAA | | REMAINING SHEET LENGTH: 1,000m | | |
|---|---|---|---|---|
| JOB NO. | JOB NAME | STATUS | NUMBER OF PAGES | USE SHEET LENGTH [m] |
| 001 | JOB0001 | WAITING | 3,000 | 33,000 |
| 002 | JOB0002 | WAITING | 5,000 | 60,000 |
| 003 | JOB0003 | WAITING | 100 | 1,100 |
| ⋮ | ⋮ | ⋮ | ⋮ | ⋮ |

FIG. 18

| SHEET IDENTIFIER: AAAA | | | REMAINING SHEET LENGTH: 32,000m | |
|---|---|---|---|---|
| JOB NO. | JOB NAME | STATUS | NUMBER OF PAGES | USE SHEET LENGTH [m] |
| 004 | JOB0004 | WAITING | 2,000 | 22,000 |
| 006 | JOB0006 | WAITING | 1,000 | 11,000 |
| 005 | JOB0005 | WAITING | 500 | 5,500 |
| ⋮ | ⋮ | ⋮ | ⋮ | ⋮ |

# IMAGE FORMING APPARATUS, PAPER MANAGEMENT METHOD AND COMPUTER-READABLE MEDIUM

CROSS-REFERENCE TO RELATED APPLICATIONS

This application is a continuation-in-part of application Ser. No. 12/548,775 filed on Aug. 27, 2009. And, this application is based on and claims priority under 35 USC 119 from Japanese Patent Application Nos. 2009-076057 filed on Mar. 26, 2009 and 2009-257177 filed on Nov. 10, 2009.

BACKGROUND

Technical Field

The present invention relates to an image forming apparatus, a paper management method and a computer readable medium.

SUMMARY

According to an aspect of the present invention, an image forming apparatus includes: a storage unit that stores an identifier of a roll sheet that has been used in an image formation and a remaining sheet length thereof after the image formation has been finished; a specifying unit that analyzes an image forming instruction and that specifies sheet lengths of pages where images are to be formed based on the image forming instruction, and a number of the pages; a computing unit that calculates a sheet length required for an image formation in accordance with the image forming instruction based on the sheet lengths and the number of the pages specified by the specifying unit; and a selection unit that selects a roll sheet to be used for the image formation in accordance with the image forming instruction based on the sheet length calculated by the computing unit and the remaining sheet length stored in the storage unit.

BRIEF DESCRIPTION OF THE DRAWINGS

An exemplary embodiment of the invention will be described in detail based on the following figures, wherein:

FIGS. 8A to 8D illustrate display examples of a display/operation portion 12;

FIGS. 11A to 11C illustrate display examples of a display/operation portion 12;

FIG. 14 illustrates a display example of a display/operation portion 12;

FIG. 18 illustrates a display example of the display/operation portion 12.

DETAILED DESCRIPTION

An image forming apparatus and a paper management program according to exemplary embodiments of the invention will be described below in detail with reference to the accompanying drawings.

First Exemplary Embodiment

Figure 1:
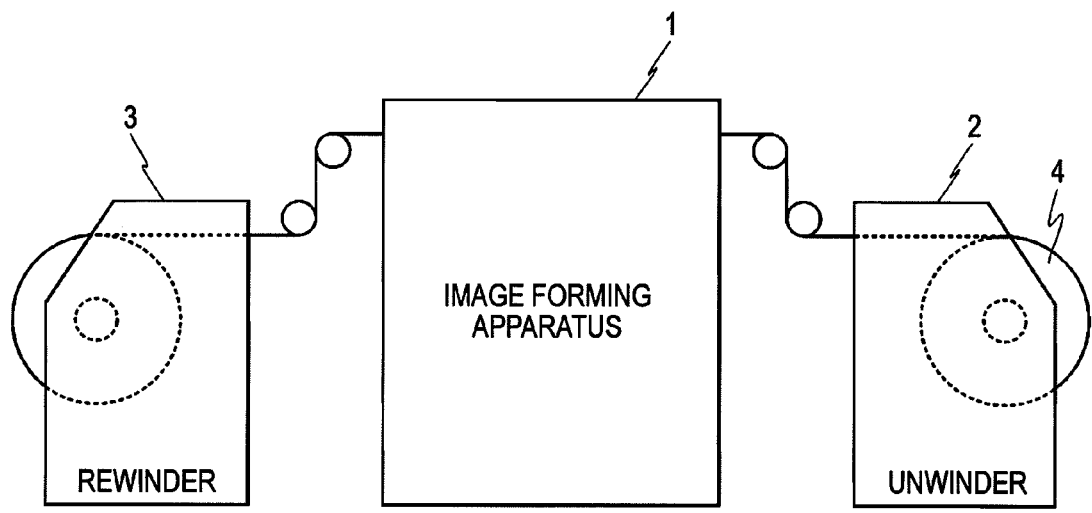
FIG. 1 illustrates a use form example of an image forming apparatus.

FIG. 1 illustrates a use form example of an image forming apparatus. As shown in FIG. 1, an image forming apparatus 1 operates together with an unwinder 2 and a rewinder 3 so as to perform printing on a roll sheet 4 set in the unwinder 2 and to put a result of the printing into the rewinder 3.

Figure 2:
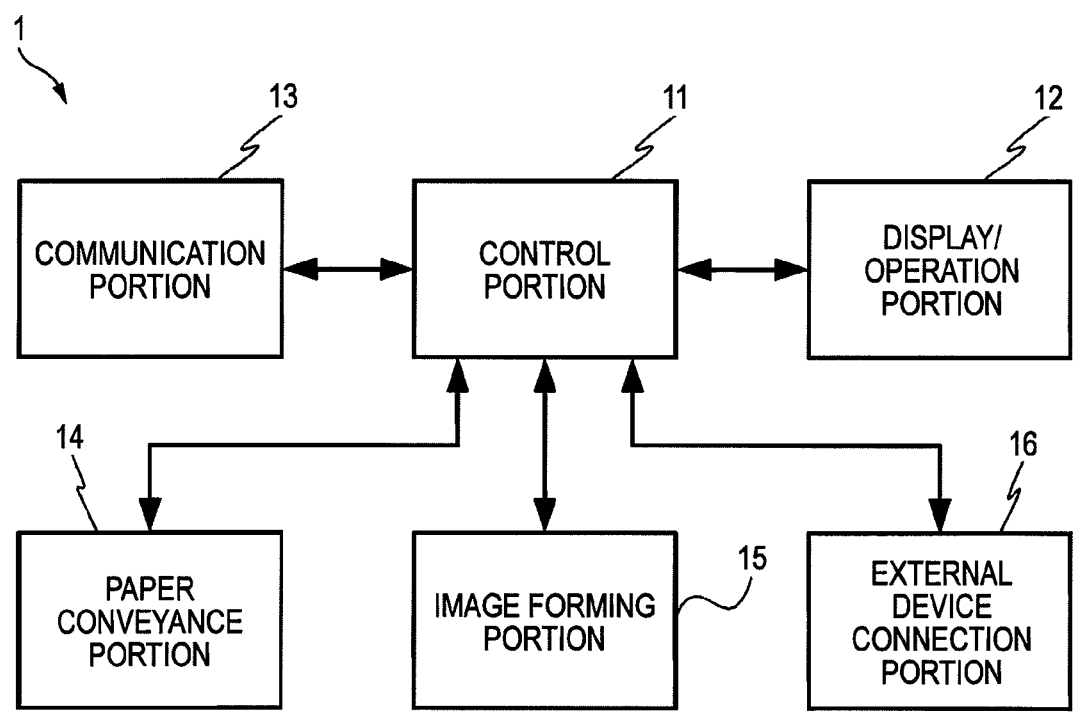
FIG. 2 illustrates an exemplary configuration of an image forming apparatus 1.

Next, the configuration of the image forming apparatus 1 will be described. FIG. 2 illustrates an exemplary configuration of the image forming apparatus 1.

As shown in FIG. 2, the image forming apparatus 1 has a control portion 11, a display/operation portion 12, a communication portion 13, a paper conveyance portion 14, an image forming portion 15 and an external device connection portion 16.

Figure 3:
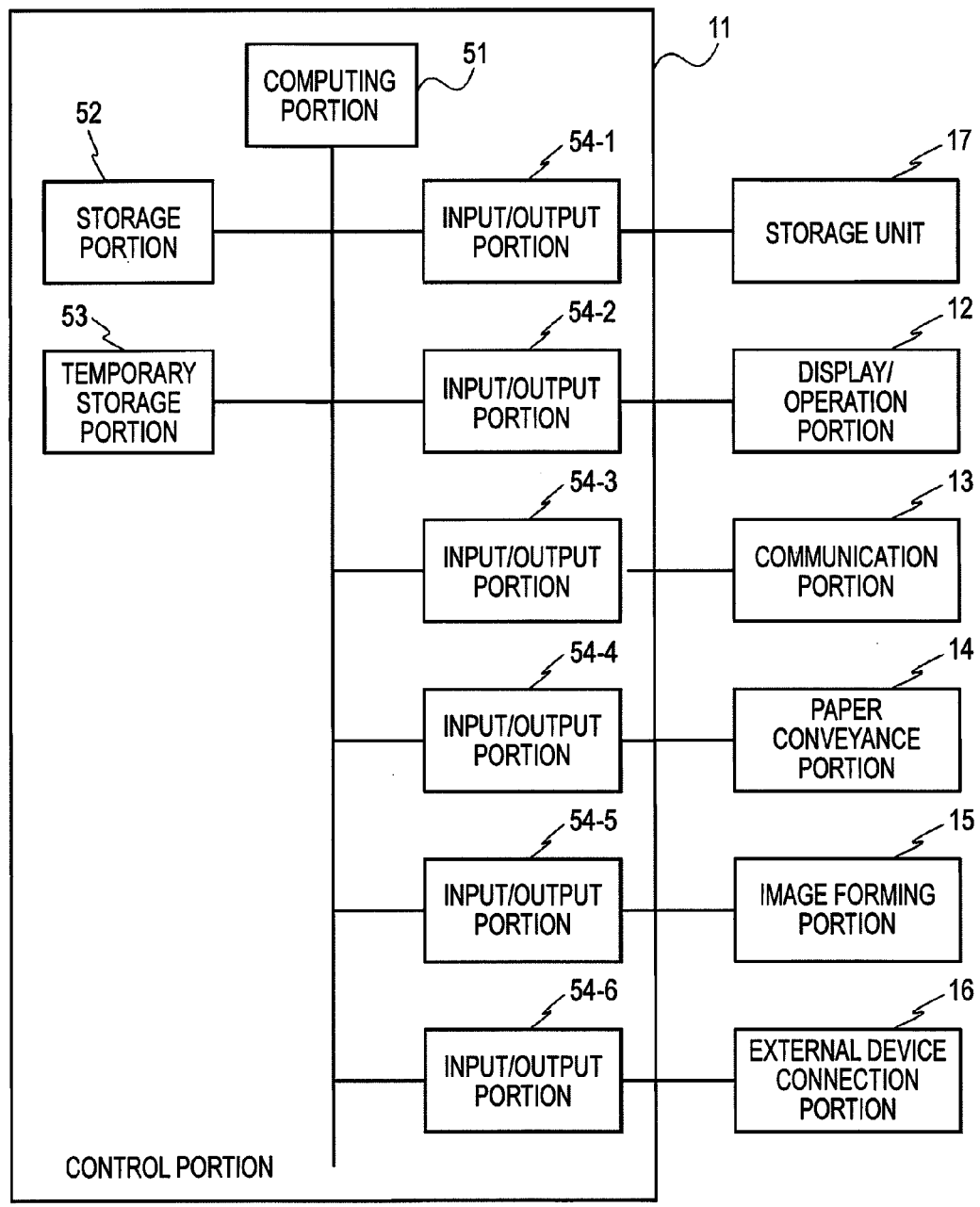
FIG. 3 illustrates an exemplary configuration of a control portion 11.

The control portion 11 controls the other portions to work together. For example, the control portion 11 has a configuration as shown in FIG. 3. In the configuration example shown in FIG. 3, the control portion 11 has a computing portion 51, a storage portion 52, a temporary storage portion 53 and input/output portions 54 (54-1 to 54-6). The computing portion 51 performs arithmetic processing. For example, the computing portion 51 is implemented with a processor such as a CPU (Central Processing Unit). The storage portion 52 stores programs, information, etc. for operating the computing portion 51. For example, the storage portion 52 is implemented with a memory such as an ROM (Read Only Memory) or a nonvolatile memory. The temporary storage portion 53 stores information etc. temporarily. For example, the temporary storage portion 53 is implemented with a memory such as an RAM (Random Access Memory). The input/output portions 54 are interfaces for connection with a storage unit 17, the display/operation portion 12, the communication portion 13, the paper conveyance portion 14, the image forming portion 15 and the external device connection portion 16 respectively. The storage unit 17 belongs to the control portion 11 in the configuration example shown in FIG. 2. The storage unit 17 stores print data etc.

The display/operation portion 12 is constituted by a display unit and an input unit. The display/operation portion 12 displays information for a user (operator) and accepts an operation instruction input from the user.

The communication portion 13 communicates with a computer or the like. The communication portion 13 receives a print job including a print instruction and print data from the computer or the like which is communicatable therewith.

The paper conveyance portion 14 conveys paper (roll sheet) unwound from the unwinder 2. The paper conveyance portion 14 conveys the paper in conjunction with the operation of the image forming portion 15 at the time of printing.

The image forming portion 15 forms and prints an image on the paper conveyed by the paper conveyance portion 14, based on the print job received by the communication portion 13.

The external device connection portion 16 is an interface for communicatable connection with the unwinder 2 and the rewinder 3. Control signals are sent from the control portion 11 to the unwinder 2 and the rewinder 3 connected to the external device connection portion 16, so as to make the unwinder 2 and the rewinder 3 work in conjunction with the paper conveyance portion 14 at the time of printing.

Figure 4:
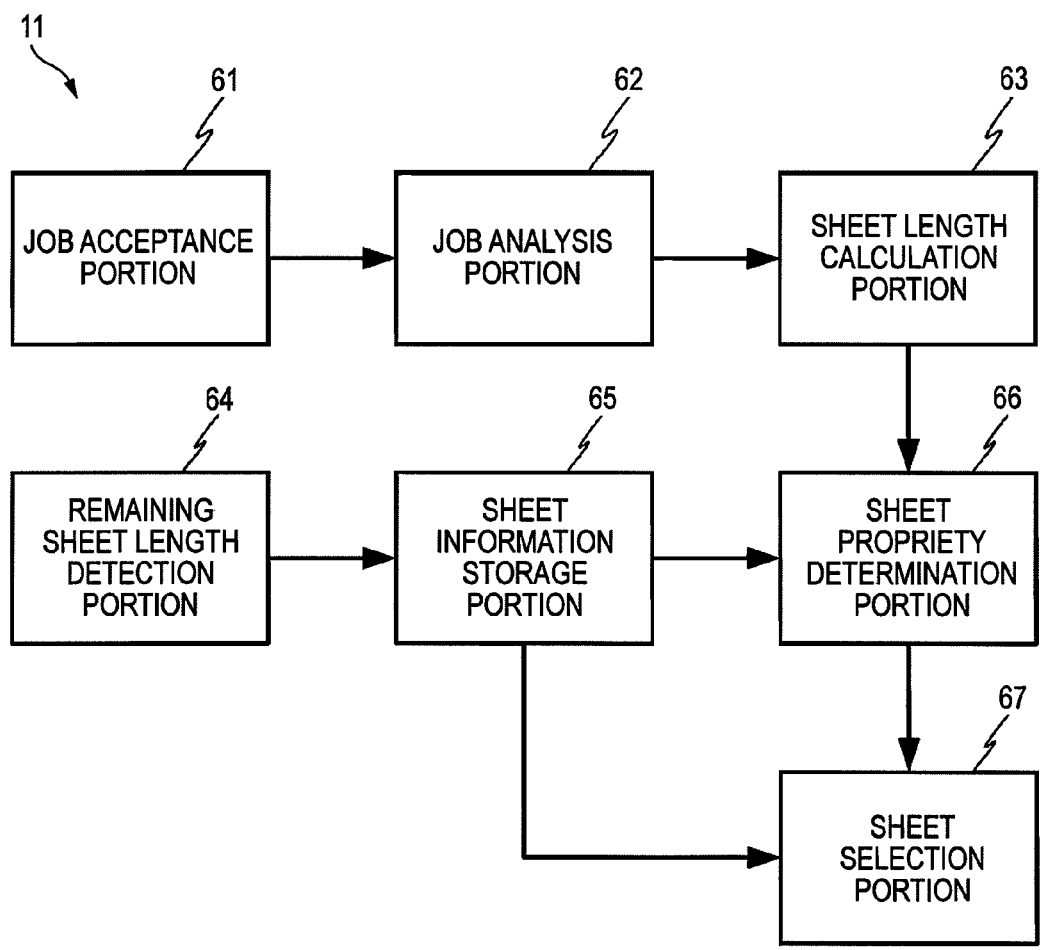
FIG. 4 illustrates an exemplary functional configuration of the control portion 11.

Next, a functional configuration of the control portion 11 will be described. FIG. 4 illustrates an exemplary functional configuration of the control portion 11. Each functional portion shown in FIG. 4 is implemented by the computing portion 51 operating in accordance with a program stored in the storage portion 52. In FIG. 4, functional portion related to the management of paper is not shown.

As shown in FIG. 4, the control portion 11 has a job acceptance portion 61, a job analysis portion 62, a sheet length calculation portion 63, a remaining sheet length detection portion 64, a sheet information storage portion 65, a sheet propriety determination portion 66 and a sheet selection portion 67.

The job acceptance portion 61 accepts a print job received by the communication portion 13. The print job accepted by the job acceptance portion 61 is stored in the storage portion 17.

The job analysis portion 62 analyzes the job accepted by the job acceptance portion 61, and specifies respective sheet lengths of pages to be printed and the number of the pages.

Based on the sheet lengths and the number of the pages specified by the job analysis portion 62, the sheet length calculation portion 63 calculates a sheet length of paper required for printing in accordance with the print job.

As soon as printing in accordance with any print job is terminated, the remaining sheet length detection portion 64 detects a remaining sheet length (remaining sheet quantity) of a roll sheet used for the printing, based on signals from the paper conveyance portion 14, the image forming portion 15, etc.

The sheet information storage portion 65 stores sheet information in the storage portion 52 or the storage unit 17. The sheet information includes the remaining sheet length of the roll sheet detected by the remaining sheet length detection portion 64 together with an identifier of the roll sheet.

The sheet propriety determination portion 66 determines whether a present roll sheet set in the unwinder 2 is suitable to execute the print job or not, based on the sheet length of paper required for printing (hereinafter referred to as "required sheet length") which length is calculated by the sheet length calculation portion 63 and the sheet information stored in the sheet information storage portion 65. When a result of the determination concludes that the present roll sheet set in the unwinder 2 is suitable, a display or the like to show that the sheet is suitable is performed on the display/operation portion 12.

When the sheet propriety determination portion 66 concludes that the present roll sheet set in the unwinder 2 is not suitable to execute the print job, the sheet selection portion 67 selects a suitable sheet based on the required sheet length calculated by the sheet length calculation portion 63 and the sheet information stored in the sheet information storage portion 65, and displays an identifier or the like of the selected sheet on the display/operation portion 12.

Figure 5:
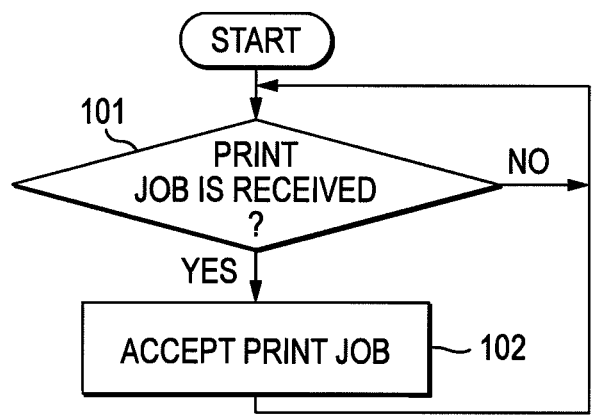
FIG. 5 illustrates an exemplary operation flow in the control portion 11.
Figure 6:
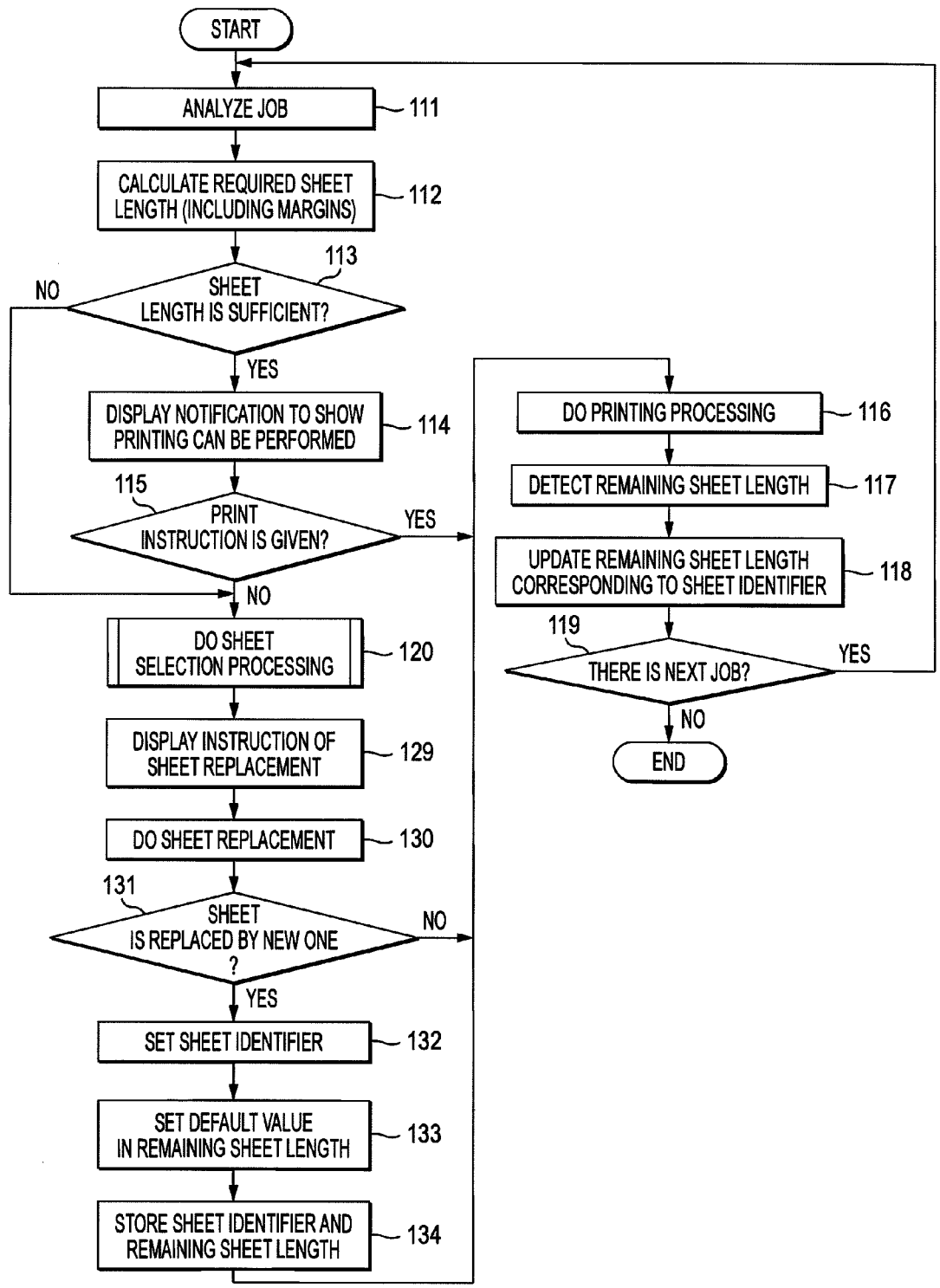
FIG. 6 illustrates an exemplary operation flow in the control portion 11.
Figure 7:
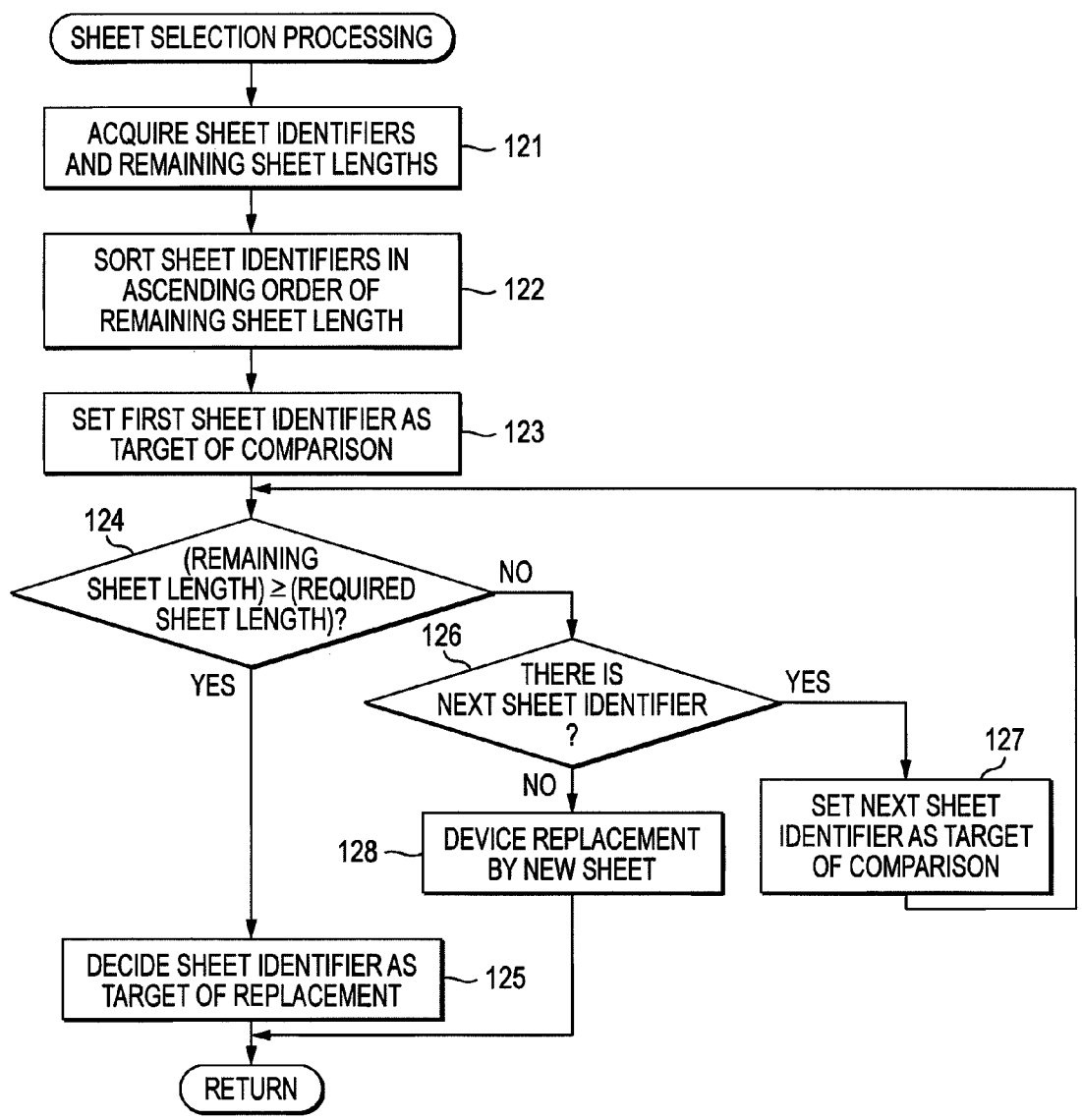
FIG. 7 illustrates an exemplary operation flow in the control portion 11.

Next, the operation of the control portion 11 will be described. FIGS. 5-7 illustrate the exemplary operation flow of the control portion 11.

When the communication portion 13 receives a print job (YES in Step 101), the control portion 11 accepts the print job received by the job acceptance portion 61 and stores the print job in the storage unit 17 (Step 102). The acceptance of the print job is executed in parallel with other processings.

After the print job is accepted, the control portion 11 executes the accepted print job. First, the job analysis portion 62 analyzes the print job, and specifies the sheet lengths of respective pages to be printed for execution of the print job and the number of the pages (Step 111). Based on the specified sheet lengths of the respective pages and the specified number of the pages, the sheet length calculation portion 63 calculates a required sheet length (Step 112). On this occasion, the sheet length calculation portion 63 calculates the required sheet length including margins of paper required for printing or cutting the paper.

Next, the sheet propriety determination portion 66 determines whether a present roll sheet set in the unwinder 2 is suitable to execute the print job or not, based on the required sheet length calculated by the sheet length calculation portion 63 and the sheet information stored in the sheet information storage portion 65. When the remaining sheet length of the present roll sheet set in the unwinder 2 is sufficient (YES in Step 113), the sheet propriety determination portion 66 performs a display on the display/operation portion 12 to show that the print job can be executed on the roll sheet set in the unwinder 2 (Step 114). This display is, for example, performed as shown in FIG. 8A.

When the user operates the display/operation portion 12 to give an instruction to execute the print job in response to the display that the print job can be executed (YES in Step 115), the control portion 11 controls the paper conveyance portion 14 and the image forming portion 15 while controlling the unwinder 2 and the rewinder 3 through the external device connection portion 16 so as to perform printing processing (Step 116). When the printing processing is terminated, the remaining sheet length detection portion 64 detects the remaining sheet length of the roll sheet used for the printing, based on signals from the paper conveyance portion 14, the image forming portion 15, etc. (Step 117). Based on the detected remaining sheet length, the sheet information storage portion 65 updates the remaining sheet length corresponding to the sheet identifier of the roll sheet set in the unwinder 2 (Step 118).

When another job to be executed next has been accepted, for example, when the job acceptance portion 61 accepts the job (YES in Step 119) during the processing after Step 111 is performed, the control portion 11 returns to Step 111 to perform similar processing on the next job. When no job to be executed next has been accepted, processing is terminated.

On the contrary, when the sheet propriety determination portion 66 concludes that the remaining sheet length of the roll sheet set in the unwinder 2 is insufficient (NO in Step 113), or when the user gives no instruction to print on the roll sheet set in the unwinder 2 in spite of its sufficient remaining sheet length (NO in Step 115), the sheet selection portion 67 performs sheet selection processing (Step 120).

In the sheet selection processing, the sheet selection portion 67 first acquires all the sheet identifiers stored in the sheet information storage portion 65, and the remaining sheet lengths corresponding to the sheet identifiers (Step 121). Subsequently, the sheet selection portion 67 sorts the sheet identifiers in ascending order of corresponding acquired remaining sheet length (Step 122), and sets, as a first target of comparison, the first sheet identifier, that is, the sheet identifier whose remaining sheet length is the shortest (Step 123).

Next, the sheet selection portion 67 compares the remaining sheet length of the sheet identifier set as the target of comparison with the required sheet length. When the remaining sheet length is not shorter than the required sheet length (YES in Step 124), the sheet selection portion 67 decides, as a target of replacement, the sheet identifier set as the target of comparison (Step 125).

On the contrary, assume that a result of the comparison concludes that the remaining sheet length is shorter than the required sheet length (NO in Step 124). In this case, when there is a sheet identifier which has not yet been compared (YES in Step 126), the next one of the sorted sheet identifiers is set as a target of comparison (Step 127). The remaining sheet length of the sheet identifier is compared with the required sheet length in the same manner.

When a result of comparison of the remaining sheet lengths of all the sheet identifiers stored in the sheet information storage portion 65 with the required sheet length concludes that any remaining sheet length is shorter than the required sheet length (NO in Step 126), a new sheet is decided as a target of replacement (Step 128).

When a sheet as a target of replacement is decided by the sheet selection processing, the sheet selection portion 67 makes the display/operation portion 12 display that the present sheet has to be replaced by the sheet identifier of the sheet decided as a target of replacement or by a new sheet (Step 129). For example, the sheet identifier of the sheet decided as a target of replacement is displayed as shown in FIG. 8B. On this occasion, for example, a screen shown in FIG. 8C is also displayed, as a status of execution of the print job, on the display/operation portion 12. After the sheet is replaced, for example, a screen shown in FIG. 8D is displayed as a status of execution of the print job.

The sheet is replaced by the user in response to the display (Step 130). When the sheet is replaced by a new sheet (YES in Step 131), the sheet information storage portion 65 sets a sheet identifier for the new sheet (Step 132), sets a default value as the remaining sheet length thereof (Step 133), and stores the set sheet identifier and the set remaining sheet length (Step 134). The sheet identifier may be generated automatically, or may be inputted through the display/operation portion 12 by the user.

Subsequently, the control portion 11 controls the paper conveyance portion 14 and the image forming portion 15 while controlling the unwinder 2 and the rewinder 3 through the external device connection portion 16 so as to perform printing processing (Step 116). When the printing processing is terminated, the remaining sheet length detection portion 64 detects the remaining sheet length of the roll sheet used for the printing, based on signals from the paper conveyance portion 14, the image forming portion 15, etc. (Step 117). Based on the detected remaining sheet length, the sheet information storage portion 65 updates the remaining sheet length corresponding to the sheet identifier of the roll sheet set in the unwinder 2 (Step 118).

When another job to be executed next has been accepted, for example, when the job acceptance portion 61 has accepted the job during processing of Step 111 et seq. (YES in Step 119), the control portion 11 returns to Step 111 to perform similar processing on the next job. When no job to be executed next has been accepted, processing is terminated.

Second Exemplary Embodiment

In the first exemplary embodiment, a sheet is selected every time when one print job is executed. In the second exemplary embodiment, a sheet is selected for execution of a plurality of print jobs. In the second exemplary embodiment, the configuration of the control portion 11 and so on is the same as that in the first exemplary embodiment, except the operation of the control portion 11. The description of the configuration will be therefore omitted, while only the operation will be described.

Figure 9:
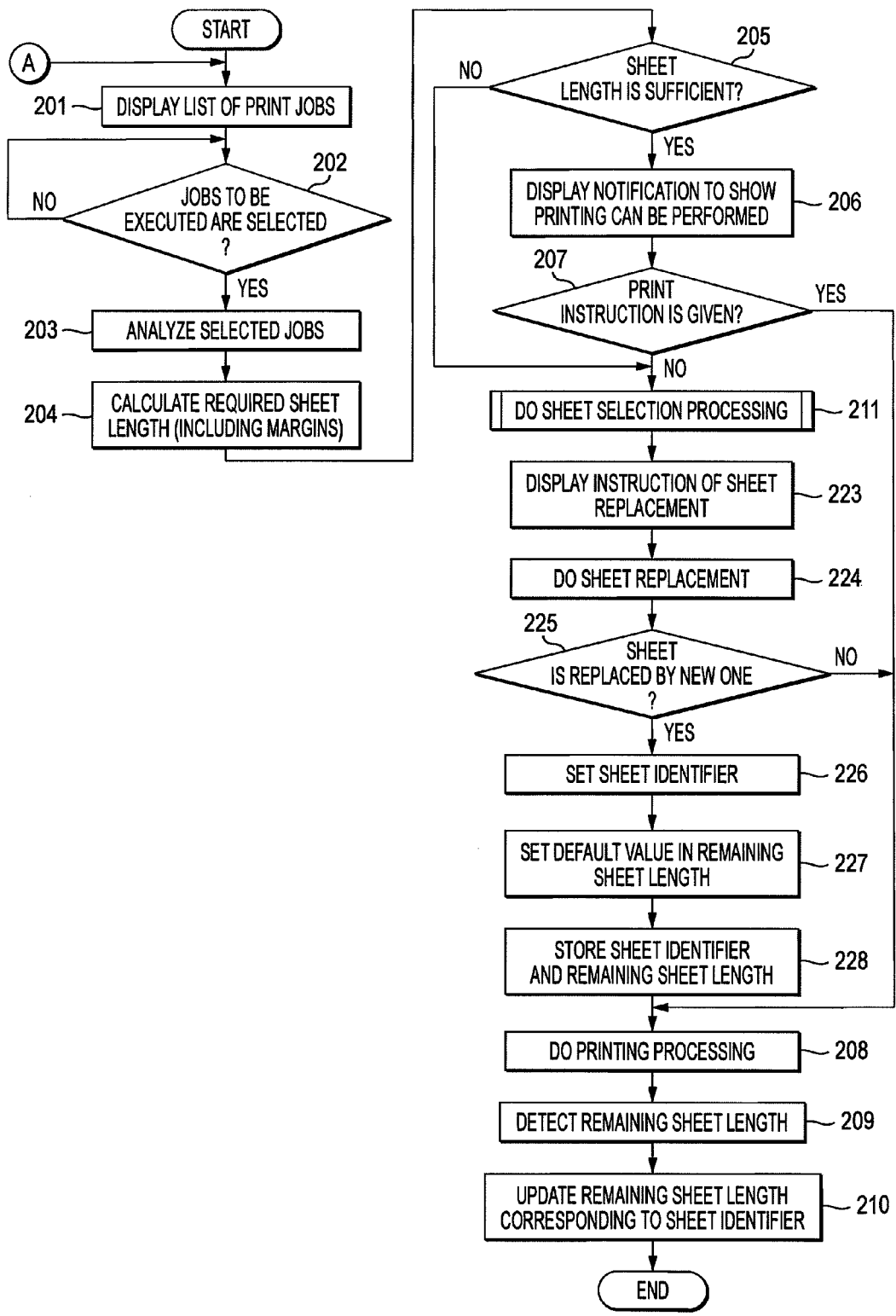
FIG. 9 illustrates an exemplary operation flow in the control portion 11.
Figure 10:
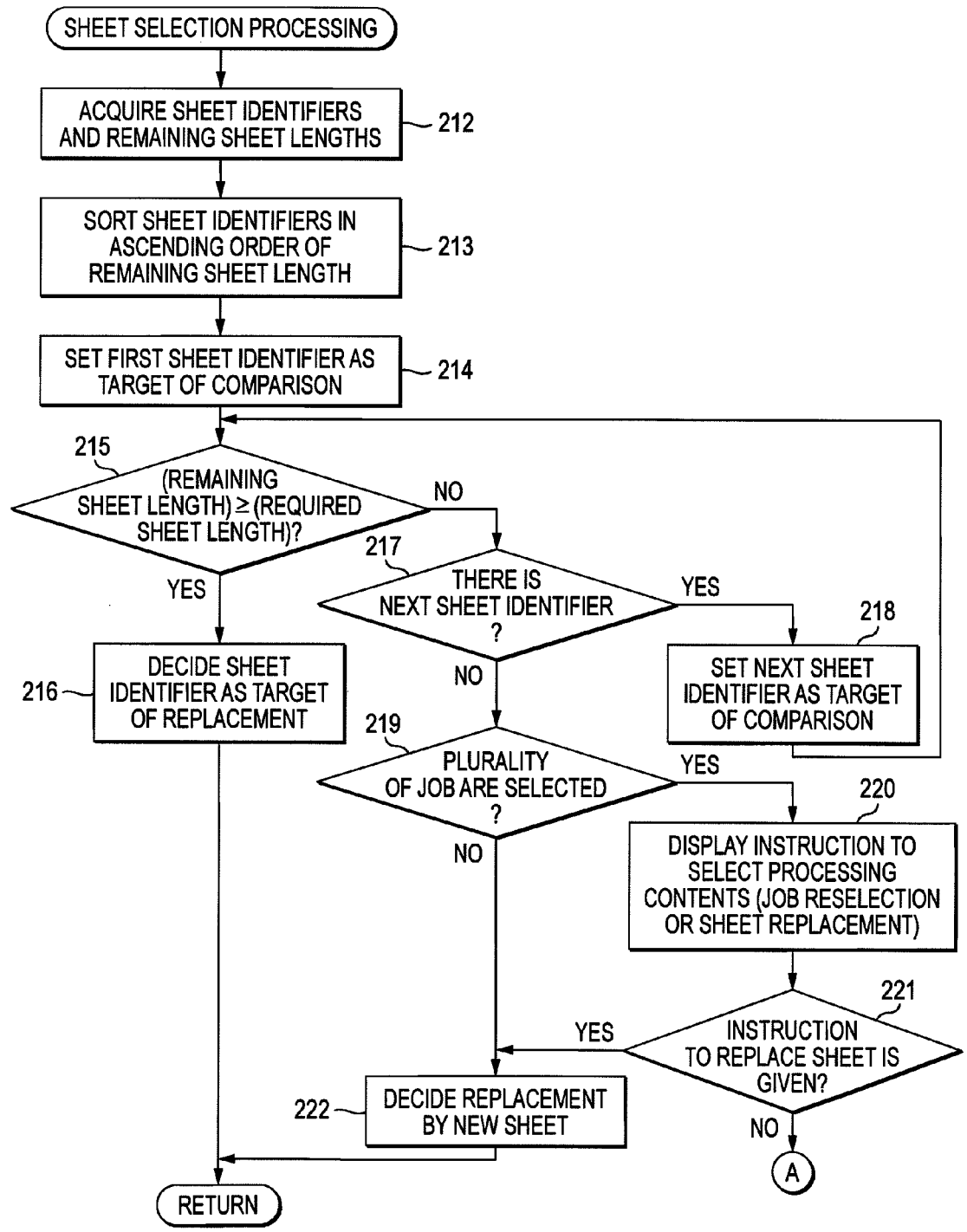
FIG. 10 illustrates an exemplary operation flow in the control portion 11.

FIGS. 9 and 10 illustrate the exemplary operation flow in the control portion 11. Reception and acceptance of a print job are processed in the same manner as in the first exemplary embodiment so that FIG. 5 will be referred to.

When the communication portion 13 receives a print job (YES in Step 101), the control portion 11 accepts the print job received by the job acceptance portion 61 and stores the print job in the storage unit 17 (Step 102). The acceptance of the print job is executed in parallel with other processings.

When the user inputs an instruction for execution of the print job through the display/operation portion 12 after the print job is accepted, the control portion 11 displays a list of print jobs on the display/operation portion 12 (Step 201). For example, the list of print jobs is displayed as shown in FIG. 11A.

When the user selects print jobs to be executed from the displayed list of print jobs as illustrated in FIG. 11B (YES in Step 202), the selected print jobs are displayed as a reversing display. Then, the job analysis portion 62 analyzes the selected print jobs, and specifies the sheet lengths of respective pages to be printed for execution of the print jobs and the number of the pages (Step 203). Based on the specified sheet lengths of the respective pages and the specified number of the pages, the sheet length calculation portion 63 calculates a required sheet length (Step 204). On this occasion, the sheet length calculation portion 63 calculates the required sheet length including margins of paper required for printing or cutting the paper.

Next, the sheet propriety determination portion 66 determines whether a present roll sheet set in the unwinder 2 is suitable to execute the print jobs or not, based on the required sheet length calculated by the sheet length calculation portion 63 and the sheet information stored in the sheet information storage portion 65. When the remaining sheet length of the present roll sheet set in the unwinder 2 is sufficient (YES in Step 205), the sheet propriety determination portion 66 performs a display on the display/operation portion 12 to show that the print jobs can be executed on the roll sheet set in the unwinder 2 (Step 206).

When the user operates the display/operation portion 12 to give an instruction to execute the print jobs in response to the display that the print jobs can be executed (YES in Step 207), the control portion 11 controls the paper conveyance portion 14 and the image forming portion 15 while controlling the unwinder 2 and the rewinder 3 through the external device connection portion 16 so as to perform printing processing (Step 208). When the printing processing is terminated, the remaining sheet length detection portion 64 detects the remaining sheet length of the roll sheet used for the printing, based on signals from the paper conveyance portion 14, the image forming portion 15, etc. (Step 209). Based on the detected remaining sheet length, the sheet information storage portion 65 updates the remaining sheet length corresponding to the sheet identifier of the roll sheet set in the unwinder 2 (Step 210). Thus, processing is terminated.

On the contrary, when the sheet propriety determination portion 66 concludes that the remaining sheet length of the roll sheet set in the unwinder 2 is insufficient (NO in Step 205), or when the user gives no instruction to print on the roll sheet set in the unwinder 2 in spite of its sufficient remaining sheet length (NO in Step 207), the sheet selection portion 67 performs sheet selection processing (Step 211).

In the sheet selection processing, the sheet selection portion 67 first acquires all the sheet identifiers stored in the sheet information storage portion 65, and the remaining sheet lengths corresponding to the sheet identifiers (Step 212). Subsequently, the sheet selection portion 67 sorts the sheet identifiers in ascending order of corresponding acquired remaining sheet length (Step 213), and sets, as a first target of comparison, the first sheet identifier, that is, the sheet identifier whose remaining sheet length is the shortest (Step 214).

Next, the sheet selection portion 67 compares the remaining sheet length of the sheet identifier set as the target of comparison with the required sheet length. When the remaining sheet length is not shorter than the required sheet length (YES in Step 215), the sheet selection portion 67 decides, as a target of replacement, the sheet identifier set as the target of comparison (Step 216).

On the contrary, assume that a result of the comparison concludes that the remaining sheet length is shorter than the required sheet length (NO in Step 215). In this case, when there is a sheet identifier which has not yet been compared (YES in Step 217), the next one of the sorted sheet identifiers is set as a target of comparison (Step 218). The remaining sheet length of the sheet identifier is compared with the required sheet length in the same manner.

Assume that a result of comparison of the remaining sheet lengths of all the sheet identifiers stored in the sheet information storage portion 65 with the required sheet length concludes that each of all remaining sheet lengths is shorter than the required sheet length (NO in Step 217). In this case, when a plurality of print jobs are selected as print jobs instructed to be executed (YES in Step 219), the sheet selection portion 67 performs a display on the display/operation portion 12 to ask the user to give an instruction either to select again print jobs to be executed or to replace the present sheet by a new sheet (Step 220). As a result, when the user gives an instruction to select print jobs again (NO in Step 221), the sheet selection portion 67 returns to Step 201 to display a list of print jobs and wait for the user to select jobs again. In the list of print jobs displayed for the reselection of jobs, the number of pages and the use sheet length calculated for each print job may be displayed, for example, as shown in FIG. 11C.

When the user gives an instruction to replace the present sheet by a new one (NO in Step 221), or when a single print job is selected as a print job instructed to be executed (NO in Step 219), a new sheet is decided as a target of replacement (Step 222).

When a sheet as a target of replacement is decided by the sheet selection processing, the sheet selection portion 67 makes the display/operation portion 12 display that the present sheet has to be replaced by the sheet identifier of the sheet decided as a target of replacement or by a new sheet (Step 223).

The sheet is replaced by the user in response to the display (Step 224). When the sheet is replaced by a new sheet (YES in Step 225), the sheet information storage portion 65 sets a sheet identifier for the new sheet (Step 226), sets a default value as the remaining sheet length thereof (Step 227), and stores the set sheet identifier and the set remaining sheet length (Step 227). The sheet identifier may be generated automatically, or may be inputted through the display/operation portion 12 by the user.

Subsequently, the control portion 11 controls the paper conveyance portion 14 and the image forming portion 15 while controlling the unwinder 2 and the rewinder 3 through the external device connection portion 16 so as to perform printing processing (Step 208). When the printing processing is terminated, the remaining sheet length detection portion 64 detects the remaining sheet length of the roll sheet used for the printing, based on signals from the paper conveyance portion 14, the image forming portion 15, etc. (Step 209). Based on the detected remaining sheet length, the sheet information storage portion 65 updates the remaining sheet length corresponding to the sheet identifier of the roll sheet set in the unwinder 2 (Step 210). Thus, processing is terminated.

Third Exemplary Embodiment

In the second exemplary embodiment, the number of pages etc. to be printed in each print job is not calculated when the user selects jobs. In the third exemplary embodiment, the number of pages etc. to be printed in each print job is calculated before the user selects jobs. In the example described in the third exemplary embodiment, the configuration of the control portion 11 and so on is the same as that in the first and second exemplary embodiments, except the operation of the control portion 11. The description of the configuration will be therefore omitted, while only the operation will be described.

Figure 12:
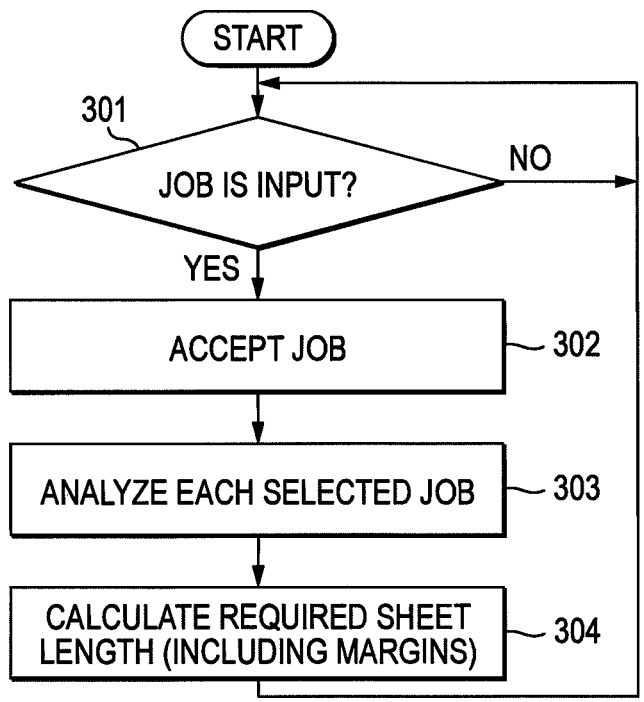
FIG. 12 illustrates an exemplary operation flow in the control portion 11.
Figure 13:
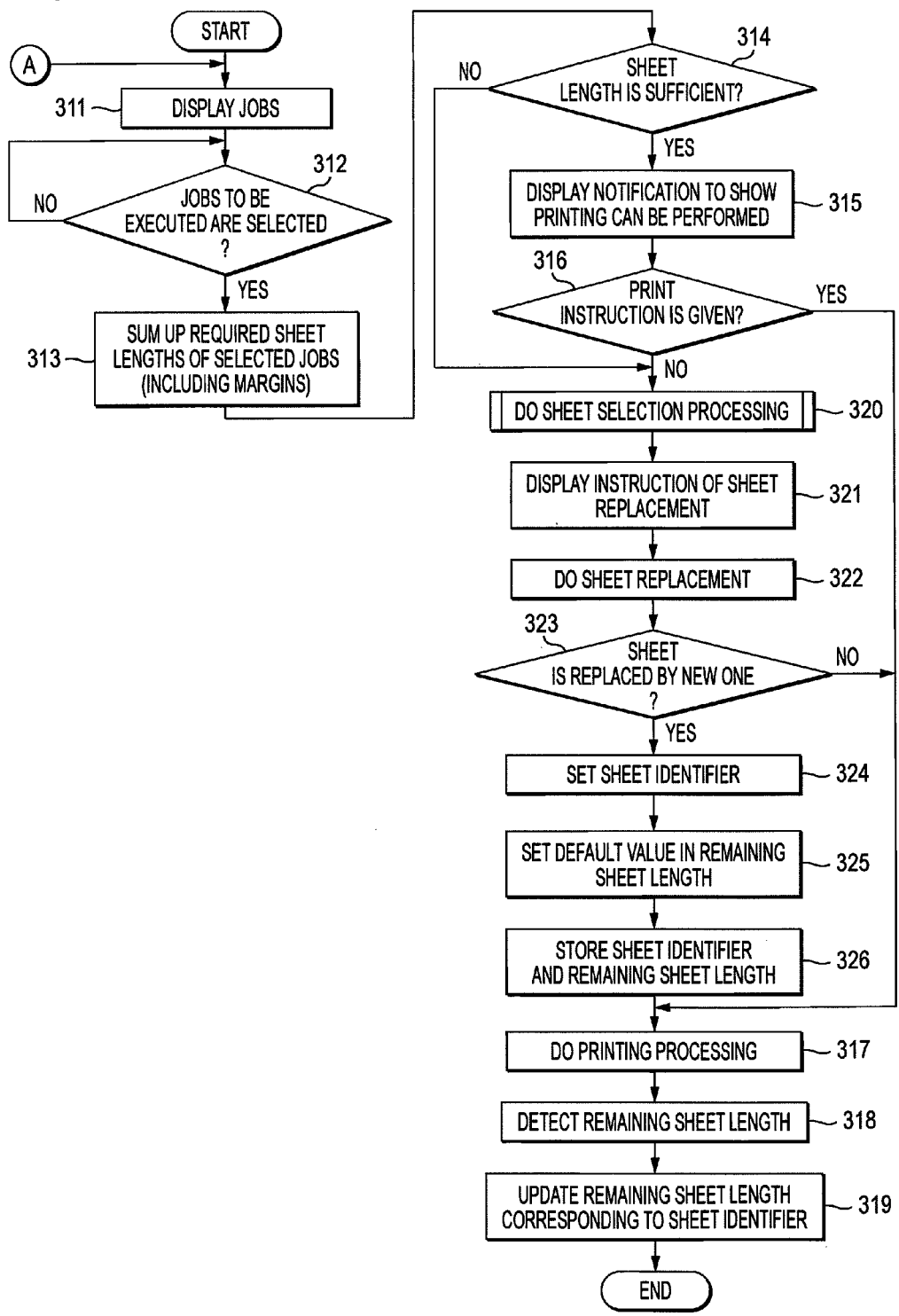
FIG. 13 illustrates an exemplary operation flow in the control portion 11.

FIGS. 12 and 13 illustrate the exemplary operation flow in the control portion 11. A part of processing (sheet selection processing) is the same as that in the second exemplary embodiment so that FIG. 10 will be referred to.

When the communication portion 13 receives a print job (YES in Step 301), the control portion 11 accepts the print job received by the job acceptance portion 61 and stores the print job in the storage unit 17 (Step 302). The job analysis portion 62 analyzes the print job, and specifies the sheet lengths of respective pages to be printed for execution of the print job and the number of the pages (Step 303). Based on the specified sheet lengths of the respective pages and the specified number of the pages, the sheet length calculation portion 63 calculates a required sheet length (Step 304). On this occasion, the sheet length calculation portion 63 calculates the required sheet length including margins of paper required for printing or cutting the paper. The acceptance of each print job or the like is performed in parallel with other processings.

When the user inputs an instruction to execute the print job from the display/operation portion 12 after the print job is accepted, the control portion 11 displays a list of print jobs on the display/operation portion 12 (Step 311). For example, the list of print jobs is displayed as shown in FIG. 14.

When the user selects print jobs to be executed from the displayed list of print jobs (YES in Step 312), the sheet length calculation portion 63 calculates a required sheet length (Step 313). On this occasion, the sheet length calculation portion 63 calculates the required sheet length including margins of paper required for printing or cutting the paper.

Next, the sheet propriety determination portion 66 determines whether a present roll sheet set in the unwinder 2 is suitable to execute the print jobs or not, based on the required sheet length calculated by the sheet length calculation portion 63 and the sheet information stored in the sheet information storage portion 65. When the remaining sheet length of the present roll sheet set in the unwinder 2 is sufficient (YES in Step 314), the sheet propriety determination portion 66 performs a display on the display/operation portion 12 to show that the print jobs can be executed on the roll sheet set in the unwinder 2 (Step 315).

When the user operates the display/operation portion 12 to give an instruction to execute the print jobs in response to the display that the print jobs can be executed (YES in Step 316), the control portion 11 controls the paper conveyance portion 14 and the image forming portion 15 while controlling the unwinder 2 and the rewinder 3 through the external device connection portion 16 so as to perform printing processing (Step 317). When the printing processing is terminated, the remaining sheet length detection portion 64 detects the remaining sheet length of the roll sheet used for the printing, based on signals from the paper conveyance portion 14, the image forming portion 15, etc. (Step 318). Based on the detected remaining sheet length, the sheet information storage portion 65 updates the remaining sheet length corresponding to the sheet identifier of the roll sheet set in the unwinder 2 (Step 319). Thus, processing is terminated.

On the contrary, when the sheet propriety determination portion 66 concludes that the remaining sheet length of the roll sheet set in the unwinder 2 is insufficient (NO in Step 314), or when the user gives no instruction to print on the roll sheet set in the unwinder 2 in spite of its sufficient remaining sheet length (NO in Step 316), the sheet selection portion 67 performs sheet selection processing (Step 320).

In the sheet selection processing, the sheet selection portion 67 first acquires all the sheet identifiers stored in the sheet information storage portion 65, and the remaining sheet lengths corresponding to the sheet identifiers (Step 212). Subsequently the sheet selection portion 67 sorts the sheet identifiers in ascending order of corresponding acquired remaining sheet length (Step 213), and sets, as a first target of comparison, the first sheet identifier, that is, the sheet identifier whose remaining sheet length is the shortest (Step 214).

Next, the sheet selection portion 67 compares the remaining sheet length of the sheet identifier set as the target of comparison with the required sheet length. When the remaining sheet length is not shorter than the required sheet length (YES in Step 215), the sheet selection portion 67 decides, as a target of replacement, the sheet identifier set as the target of comparison (Step 216).

On the contrary, assume that a result of the comparison concludes that the remaining sheet length is shorter than the required sheet length (NO in Step 215). In this case, when there is a sheet identifier which has not yet been compared (YES in Step 217), the next one of the sorted sheet identifiers is set as a target of comparison (Step 218). The remaining sheet length of the sheet identifier is compared with the required sheet length in the same manner.

Assume that a result of comparison of the remaining sheet lengths of all the sheet identifiers stored in the sheet information storage portion 65 with the required sheet length concludes that any remaining sheet length is shorter than the required sheet length (NO in Step 217). In this case, when a plurality of print jobs are selected as print jobs instructed to be executed (YES in Step 219), the sheet selection portion 67 performs a display on the display/operation portion 12 to ask the user to give an instruction either to select again print jobs to be executed or to replace the present sheet by a new sheet (Step 220). As a result, when the user gives an instruction to select print jobs again (NO in Step 221), the sheet selection portion 67 returns to Step 311 to display a list of print jobs and wait for the user to select jobs again.

When the user gives an instruction to replace the present sheet by a new one (NO in Step 221), or when a single print job is selected as a print job instructed to be executed (NO in Step 219), a new sheet is decided as a target of replacement (Step 222).

When a sheet as a target of replacement is decided by the sheet selection processing, the sheet selection portion 67 makes the display/operation portion 12 display that the present sheet has to be replaced by the sheet identifier of the sheet decided as a target of replacement or by a new sheet (Step 321).

The sheet is replaced by the user in response to the display (Step 322). When the sheet is replaced by a new sheet (YES in Step 323), the sheet information storage portion 65 sets a sheet identifier for the new sheet (Step 324), sets a default value as the remaining sheet length thereof (Step 325), and stores the set sheet identifier and the set remaining sheet length (Step 326). The sheet identifier may be generated automatically, or may be inputted through the display/operation portion 12 by the user.

Subsequently, the control portion 11 controls the paper conveyance portion 14 and the image forming portion 15 while controlling the unwinder 2 and the rewinder 3 through the external device connection portion 16 so as to perform printing processing (Step 317). When the printing processing is terminated, the remaining sheet length detection portion 64 detects the remaining sheet length of the roll sheet used for the printing, based on signals from the paper conveyance portion 14, the image forming portion 15, etc. (Step 318). Based on the detected remaining sheet length, the sheet information storage portion 65 updates the remaining sheet length corresponding to the sheet identifier of the roll sheet set in the unwinder 2 (Step 319). Thus, processing is terminated.

Fourth Exemplary Embodiment

In the first to third exemplary embodiments, a present roll sheet set in the unwinder 2 is replaced by a new one when the remaining sheet length of the present roll sheet is insufficient, that is, shorter than the required sheet length. However, the present roll sheet set in the unwinder 2 may be left unused if the remaining sheet length of the roll sheet is shorter than a sheet length required for a typical print job. In the fourth exemplary embodiment, therefore, processing different from those in the first to third exemplary embodiments is performed when the remaining sheet length of the present roll sheet set in the unwinder 2 is not longer than a set length (which in fact differs in accordance with an operating manner about what kind of print jobs to execute). In the fourth exemplary embodiment, only parts different from those in the first to third exemplary embodiments will be described.

Figure 15:
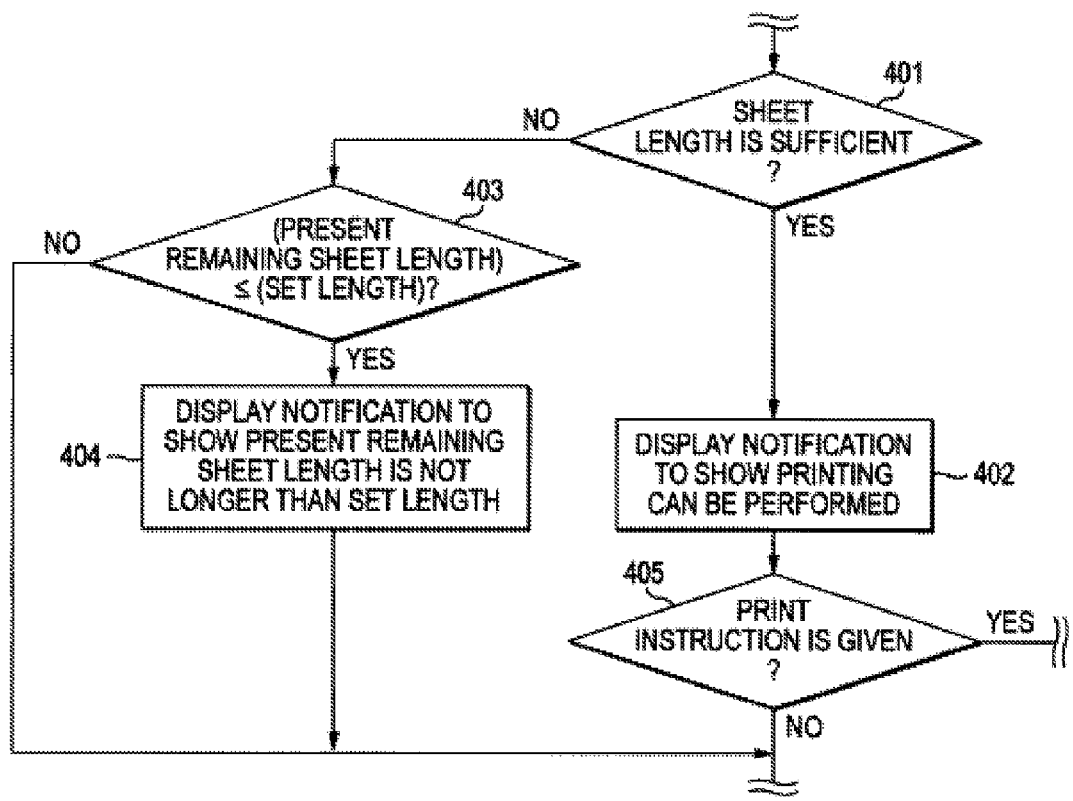
FIG. 15 illustrates an exemplary operation flow in the control portion 11.

FIG. 15 illustrates an exemplary operation flow in the control portion 11. Processing shown in FIG. 15 corresponds to a part of processing in FIG. 6 (first exemplary embodiment), FIG. 9 (second exemplary embodiment) or FIG. 13 (third exemplary embodiment).

In the control portion 11, the sheet propriety determination portion 66 determines whether a present roll sheet set in the unwinder 2 is suitable to execute print jobs or not, based on the required sheet length calculated by the sheet length calculation portion 63 and the sheet information stored in the sheet information storage portion 65. When the remaining sheet length of the present roll sheet set in the unwinder 2 is sufficient (YES in Step 401), the sheet propriety determination portion 66 performs a display on the display/operation portion 12 to show that the print jobs can be executed on the roll sheet set in the unwinder 2 (Step 402). Steps 401 and 402 correspond to the processing of Steps 113 and 114 in the first exemplary embodiment, the processing of Steps 205 and 206 in the second exemplary embodiment, and the Steps 314 and 315 in the third exemplary embodiment.

On the contrary, when the remaining sheet length of the roll sheet set in the unwinder 2 is insufficient (NO in Step 402), the sheet propriety determination portion 66 further compares the remaining sheet length with the set length. When the remaining sheet length is not longer than the set length (YES in Step 403), a notification showing that the remaining sheet length is not longer than the set value is displayed on the display/operation portion 12 (Step 404).

When the user gives an instruction to execute the print jobs from the display/operation portion 12 in response to the display showing that the print jobs can be executed, the control portion 11 performs printing processing (to Step 116 in the first exemplary embodiment, Step 208 in the second exemplary embodiment or Step 317 in the third exemplary embodiment).

When the sheet propriety determination portion 66 concludes that the remaining sheet length of the roll sheet set in the unwinder 2 is longer than the set length (NO in Step 403), the display showing that the remaining sheet length is not longer than the set value (YES in Step 403), or when the user gives no instruction to print on the roll sheet set in the unwinder 2 (NO in Step 405), the sheet selection portion 67 performs sheet selection processing (to Step 120 in the first exemplary embodiment, Step 211 in the second exemplary embodiment or Step 320 in the third exemplary embodiment).

Fifth Exemplary Embodiment

The fifth exemplary embodiment will be described in an example in which when a plurality of print jobs have been accepted, a present roll sheet set in the unwinder 2 can be used by priority, in addition to the example described in the first exemplary embodiment. In the example which will be described in the fifth exemplary embodiment, the configuration of the control portion 11 etc. is similar to that in the first exemplary embodiment, except the operation of the control portion 11. Therefore, only the operation will be described while description of the configuration will be omitted. Assume that setting as to whether the present roll sheet set in the unwinder 2 should be used by priority or a running job should be processed by priority is made by the user in advance through the display/operation portion 12.

Figure 16:
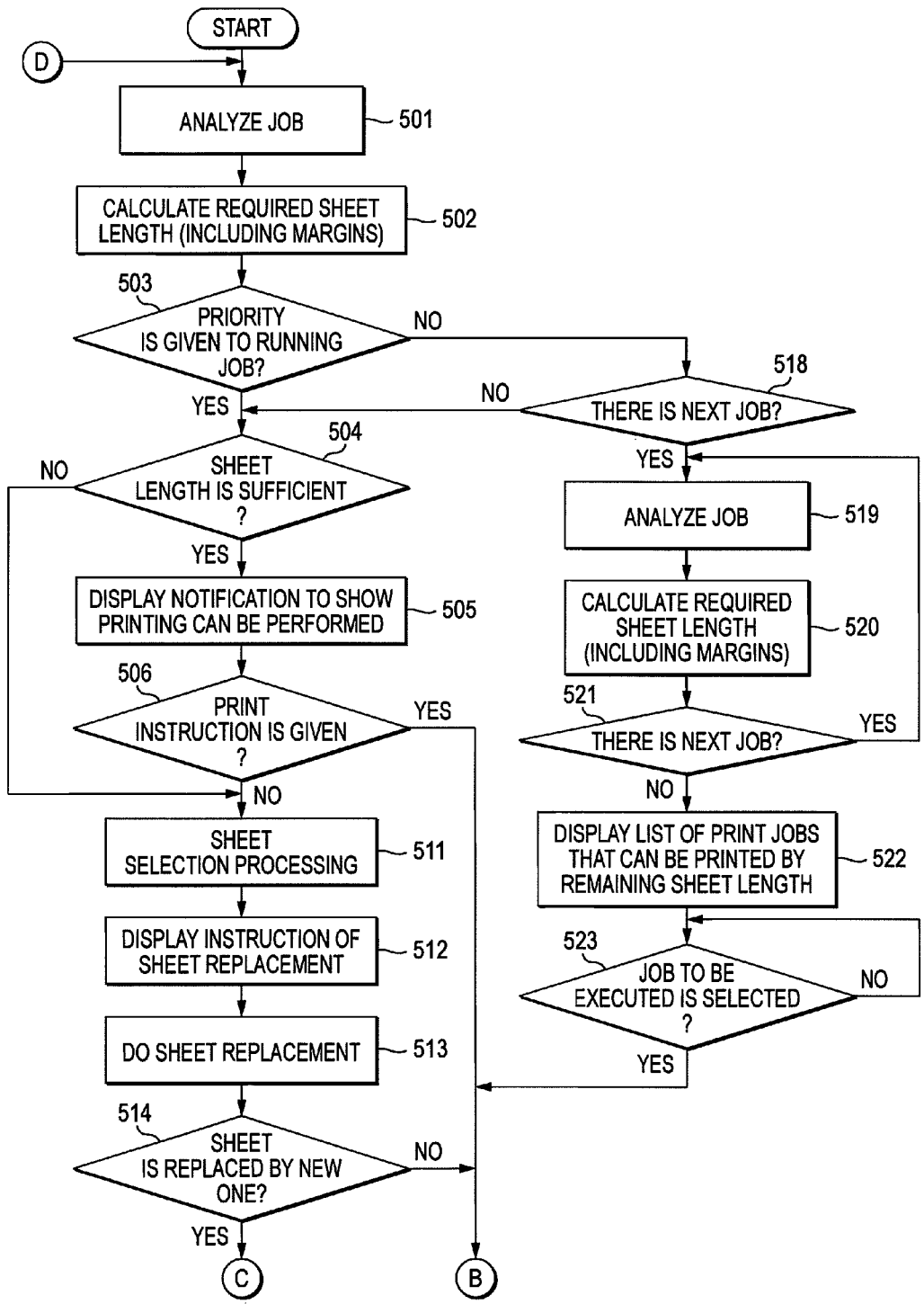
FIG. 16 illustrates an exemplary operation flow in the control portion 11.
Figure 17:
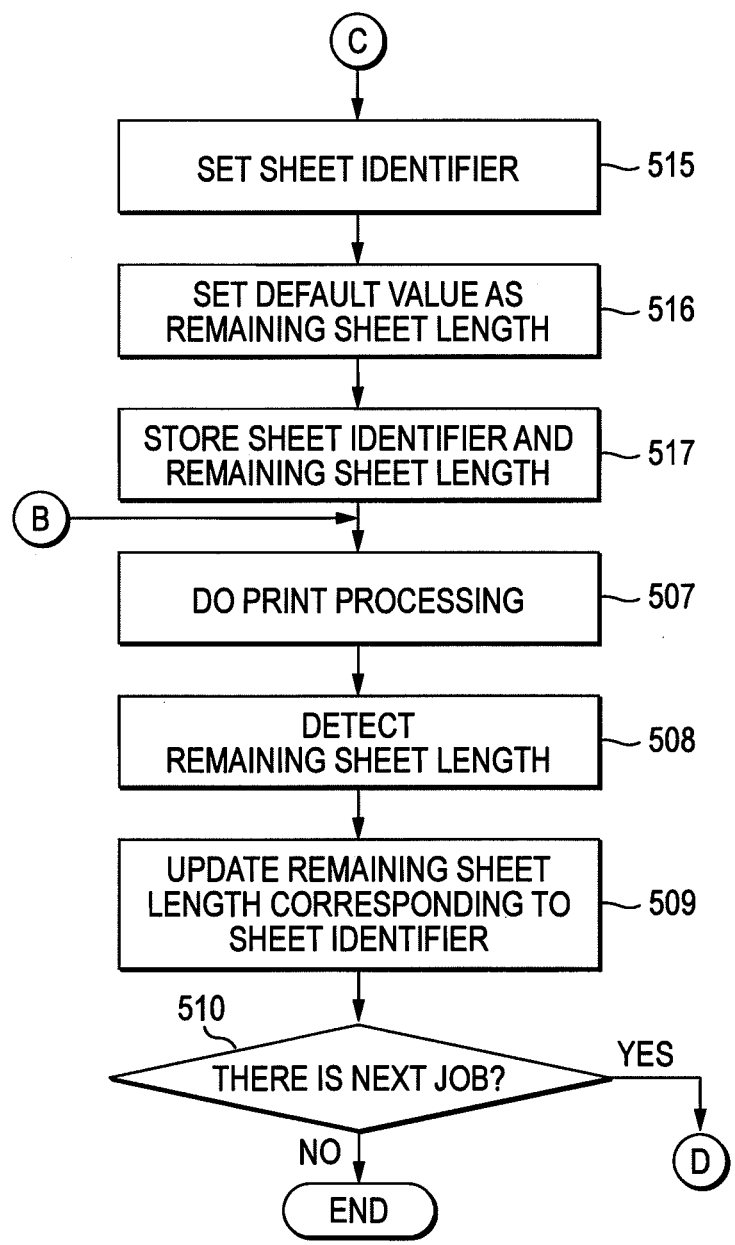
FIG. 17 illustrates an exemplary operation flow in the control portion 11.

FIGS. 16 and 17 are flow charts showing the flow of operation of the control portion 11. Processing of reception and acceptance of a print job and processing of selecting a sheet are similar to those in the first exemplary embodiment, and FIGS. 5 and 7 will be referred to.

When the communication portion 13 receives a print job (YES in Step 101 in FIG. 5), the job acceptance portion 61 in the control portion 11 accepts the received print job and stores the accepted print job into the storage portion 17 (Step 102). The acceptance of the print job is executed in parallel with other processings.

On the other hand, after the print job is accepted, the control portion 11 executes the accepted print job. First, the job analysis portion 62 analyzes the print job and specifies the sheet lengths of respective pages to be printed for execution of the print job and the number of the pages (Step 501 in FIG. 16). Based on the specified sheet lengths of the respective pages and the specified number of the pages, the sheet length calculation portion 63 calculates a required sheet length (Step 502). On this occasion, the sheet length calculation portion 63 calculates the required sheet length including margins of paper required for printing or cutting the paper.

Here, when setting is made to process a running job by priority (YES in Step 503), the sheet propriety determination portion 66 determines whether the present roll sheet set in the unwinder 2 is suitable to execution of the print job or not, based on the required sheet length calculated by the sheet length calculation portion 63 and the sheet information stored in the sheet information storage portion 65. When the remaining sheet length of the present roll sheet set in the unwinder 2 is sufficient (YES in Step 504), the sheet propriety determination portion 66 performs a display on the display/operation portion 12 to show that the print job can be executed on the roll sheet set in the unwinder 2 (Step 505). This display is, for example, made as shown in FIG. 8A.

When the user operates the display/operation portion 12 to give an instruction to execute the print job in response to the display indicating that the print job can be executed (YES in Step 506), the control portion 11 controls the paper conveyance portion 14 and the image forming portion 15 while controlling the unwinder 2 and the rewinder 3 through the external device connection portion 16 so as to perform printing processing (Step 507 in FIG. 17). When the printing processing is terminated, the remaining sheet length detection portion 64 detects the remaining sheet length of the roll sheet used for the printing, based on signals from the paper conveyance portion 14, the image forming portion 15, etc. (Step 508). Based on the detected remaining sheet length, the sheet information storage portion 65 updates the remaining sheet length corresponding to the sheet identifier of the roll sheet set in the unwinder 2 (Step 509).

When another job to be executed next has been accepted (YES in Step 510), the control portion 11 returns to Step 501 to perform similar processing on the next job. When no job to be executed next has been accepted, processing is terminated.

On the contrary, when the determination of the sheet propriety determination portion 66 results in that the remaining sheet length of the roll sheet set in the unwinder 2 is insufficient (NO in Step 504), or when the user gives no instruction to print on the roll sheet set in the unwinder 2 in spite of its sufficient remaining sheet length (NO in Step 506), the sheet selection portion 67 performs sheet selection processing (Step 511).

In the sheet selection processing, the sheet selection portion 67 first acquires all the sheet identifiers stored in the sheet information storage portion 65, and the remaining sheet lengths corresponding to the sheet identifiers (Step 121 in FIG. 7). Subsequently, the sheet selection portion 67 sorts the sheet identifiers in ascending order of corresponding acquired remaining sheet length (Step 122), and sets, as a first target of comparison, the first sheet identifier, that is, the sheet identifier whose remaining sheet length is the shortest (Step 123).

Next, the sheet selection portion 67 compares the remaining sheet length of the sheet identifier set as the target of comparison with the required sheet length. When the remaining sheet length is not shorter than the required sheet length (YES in Step 124), the sheet selection portion 67 decides, as a target of replacement, the sheet identifier set as the target of comparison (Step 125).

On the contrary, assume that the comparison results in that the remaining sheet length is shorter than the required sheet length (NO in Step 124). In this case, when there is a sheet identifier which has not yet been compared (YES in Step 126), the next one of the sorted sheet identifiers is set as a target of comparison (Step 127). The remaining sheet length of the sheet identifier is compared with the required sheet length in the same manner.

When comparison of the remaining sheet lengths of all the sheet identifiers stored in the sheet information storage portion 65 with the required sheet length results in that any remaining sheet length is shorter than the required sheet length (NO in Step 126), a new sheet is decided as a target of replacement (Step 128).

When a sheet as a target of replacement is decided by the sheet selection processing, the sheet selection portion 67 makes the display/operation portion 12 display a message indicating that the present sheet has to be replaced by the sheet identifier of the sheet decided as a target of replacement or a new sheet (Step 512 in FIG. 16). For example, the sheet identifier of the sheet decided as a target of replacement is displayed as shown in FIG. 8B. On this occasion, for example, a screen shown in FIG. 8C is also displayed, as a status of execution of the print job, on the display/operation portion 12. After the sheet is replaced, for example, a screen shown in FIG. 8D is displayed as a status of execution of the print job.

The sheet is replaced by the user in response to the display (Step 513). When the sheet is replaced by a new sheet (YES in Step 514), the sheet information storage portion 65 sets a sheet identifier for the new sheet (Step 516 in FIG. 17), sets a default value as the remaining sheet length thereof (Step 517), and stores the set sheet identifier and the set remaining sheet length (Step 518). The sheet identifier may be generated automatically, or may be inputted through the display/operation portion 12 by the user.

Subsequently, the control portion 11 controls the paper conveyance portion 14 and the image forming portion 15 while controlling the unwinder 2 and the rewinder 3 through the external device connection portion 16 so as to perform printing processing (Step 507). When the printing processing is terminated, the remaining sheet length detection portion 64 detects the remaining sheet length of the roll sheet used for the printing, based on signals from the paper conveyance portion 14, the image forming portion 15, etc. (Step 508). Based on the detected remaining sheet length, the sheet information storage portion 65 updates the remaining sheet length corresponding to the sheet identifier of the roll sheet set in the unwinder 2 (Step 509).

When another job to be executed next has been accepted, for example, when the job acceptance portion 61 has accepted the job during processing in Step 111 et seq. (YES in Step 510), the control portion 11 returns to Step 111 to perform similar processing on the next job. When no job to be executed next has been accepted, processing is terminated.

On the other hand, assume that setting is made to use the present roll sheet set in the unwinder 2 by priority (NO in Step 503 in FIG. 16). In this case, when no job to be executed next has been accepted (NO in Step 518), similar processing to that in the case where setting is made to process the running job by priority is performed.

On the contrary, when a print job to be executed next has been accepted (YES in Step 518), the job analysis portion 62 analyzes the print job and specifies the sheet lengths of respective pages to be printed for execution of the print job and the number of the pages (Step 519). Based on the specified sheet lengths of the respective pages and the specified number of the pages, the sheet length calculation portion 63 calculates a required sheet length (Step 520). On this occasion, the sheet length calculation portion 63 calculates the required sheet length including margins of paper required for printing or cutting the paper. When a further print job to be executed next has been accepted (YES in Step 521), the print job is analyzed to specify the paper lengths of respective pages and the number of the pages in the same manner.

When all the accepted print jobs have been analyzed (NO in Step 521), the paper selection portion 67 makes a display on the display/operation portion 12 to show a list of print jobs which can be executed by the present roll sheet set in the unwinder 2 (Step 522). This display is, for example, made as shown in FIG. 18. The display may be made as follows. That is, the print jobs which can be executed by the present roll sheet set in the unwinder 2 may be listed in descending order of required sheet length or in job acceptance order.

When the number of print jobs which can be executed by the present roll sheet set in the unwinder 2 is only one, the paper selection portion 67 selects the print job as a target of execution without displaying a list of print jobs.

When the user selects a desired print job to be executed from the displayed list of print jobs (YES in Step 523), the control portion 11 controls the paper conveyance portion 14 and the image forming portion 15 while controlling the unwinder 2 and the rewinder 3 through the external device connection portion 16 so as to perform printing processing (Step 507 in FIG. 17). When the printing processing is terminated, the remaining sheet length detection portion 64 detects the remaining sheet length of the roll sheet used for the printing, based on signals from the paper conveyance portion 14, the image forming portion 15, etc. (Step 508). Based on the detected remaining sheet length, the sheet information storage portion 65 updates the remaining sheet length corresponding to the sheet identifier of the roll sheet set in the unwinder 2 (Step 509).

When another job to be executed next has been accepted (YES in Step 510), the control portion 11 returns to Step 501 to perform similar processing on the next job. When no job to be executed next has been accepted, processing is terminated.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various exemplary embodiments and with the various modifications as are suited to the particular use contemplated. It is intended that the scope of the invention be defined by the following claims and their equivalents.

What is claimed is:

1. An image forming apparatus comprising:
a storage unit that stores priority information that indicates whether to process print jobs in ascending order of remaining sheet length or according to user selection, (i) a first identifier of a first paper roll and a first remaining length of paper in the first paper roll, (ii) a second identifier of a second paper roll and a second remaining length of paper in the second paper roll, and (iii) a third identifier of a current paper roll currently set in the image forming apparatus and a current remaining length of paper in the current paper roll;
a specifying unit that analyzes a plurality of next print jobs to be printed, each of the plurality of next print jobs to be printed comprising a print instruction and print data of at least one page, specifics at least one length of the at least one page of each of the plurality of next print jobs to be printed according to the print data of each of the plurality of next print jobs to be printed and a number of copies of the at least one page of each of the plurality of next print jobs to be printed according to the print instruction of each of the plurality of next print jobs to be printed;
a computing unit that calculates total lengths of paper required for printing each of the plurality of next print jobs to be printed, based on the at least one length of the at least on page of each of the plurality of next print jobs to be printed and the numbers of copies of the at least one page of each of the plurality of next print jobs to be printed specified by the specifying unit;

a selection unit that, if the priority information indicates to process print jobs in ascending order of remaining sheet length, compares the current remaining length to a current total length of paper of the plurality of next print jobs to be printed and selects the current paper roll as a selected paper roll if the current remaining length is greater than or equal to the current total length of paper of the plurality of next print jobs to be printed calculated by the computing unit, and if the current remaining length is not greater than or equal to the current total length of paper of the plurality of next print jobs to be printed then the selection unit compares, in ascending order of remaining sheet length, the first and second remaining sheet lengths with the current total length of paper of the plurality of next print jobs to be printed, and selects one of the first paper roll and the second paper roll having a length of paper that is greater than or equal to the current total length of paper as the selected paper roll, based on the current total length of paper calculated by the computing unit and the first remaining length and the second remaining length stored in the storage unit; and a display instructions unit that, if the priority information indicates to process print jobs according to user selection, (i) displays print jobs among the plurality of print jobs having total lengths of paper which is less than or equal to the current remaining length of paper, the total lengths of paper, and a current remaining length of paper in the current paper roll and (ii) receives a selection of a print job among the displayed print jobs for print processing using the current paper roll.

2. An image forming method of an image forming apparatus, the method comprising:

storing priority information that indicates whether to process print jobs in ascending order of remaining sheet length or according to user selection, (i) a first identifier of a first paper roll and a first remaining length of paper in the first paper roll, (ii) a second identifier of a second paper roll and a second remaining length of paper in the second paper roll, and (iii) a third identifier of a current paper roll currently sat in the image forming apparatus and a current remaining length of paper in the current paper roll;

analyzing a plurality of next print jobs to be printed, each of the plurality of next print jobs to be printed comprising a print instruction and print data of at least one page;

specifying at least one length of the at least one page of each of the plurality of next print jobs to be printed according to the print data of each of the plurality of next print jobs to be printed and a number of copies of the at least one page of each of the plurality of next print jobs to be printed according to the print instruction of each of the plurality of next print jobs to be printed;

calculating total lengths of paper required for printing each of the plurality of next print jobs to be printed, based on the at least one length of the at least one page of each of the plurality of next print jobs to be printed and the numbers of copies of the at least one page of each of the plurality of next print jobs to be printed;

comparing, if the priority information indicates to process print jobs in ascending order of remaining sheet length, the current remaining length to a current total length of paper of the plurality of next print jobs be printed and selects the current paper roll as a selected paper roll if the current remaining length is greater than or equal to the current total length of paper of the plurality of next print jobs to be printed, and if the current remaining length is not greater than or equal to the current total length of paper of the plurality of next print jobs to be printed then comparing, in ascending order of remaining sheet length, the first and second remaining sheet lengths with the current total length of paper of the plurality of next print jobs to be printed and selecting one of the first paper roll and the second paper roll hewing a length of paper that is greater than or equal to the current total length of paper as the selected paper roll, based on the current total length of paper, the first remaining length, and the second remaining length; and displaying, if the priority information indicates to process print jobs according to user selection, (i) print jobs among the plurality of print jobs having total lengths of paper which is less than or equal to the current remaining length of paper, the total lengths of paper, and a current remaining length of paper in the current paper roll and (ii) receiving a selection of a print job among the displayed print jobs for print processing using the current paper roll.

3. A non-transitory computer-readable recording medium having embodied thereon a program which, when executed, causes a computer to implement an image forming method, the method comprising:

storing priority information that indicates whether to process print jobs in ascending order of remaining sheet length or according to user section, (i) a first identifier of a first paper roll and a first remaining length of paper in the first paper roll, (ii) a second identifier of a second paper roll and a second remaining length of paper in the second paper roll, and (iii) a third identifier of a current paper roll currently set in the image forming apparatus and a current remaining length of paper in the current paper roll;

analyzing a plurality of next print jobs to be printed, each of the plurality of next print jobs to be printed comprising a print instruction and print data of at least one page;

specifying at least one length of the at least one page of each of the plurality of next print jobs to be printed according to the print data of each of the plurality of next print jobs to be printed and a number of copies of the at least one page of each of the plurality of next print jobs to be printed according to the print instruction of each of the plurality of next print jobs to be printed;

calculating total lengths of paper required for printing each of the plurality of next print jobs to be printed, based on the at least one length of the at least one page of each of the plurality of next print jobs to be printed and the numbers of copies of the at least one page of each of the plurality of next print jobs to be printed;

comparing, if the priority information indicates to process print jobs in ascending order of remaining sheet length, the current remaining length to a current total length of paper job of the plurality of next print jobs to be printed and selects the current paper roll as a selected paper roll if the current remaining length is greater than or equal to the current total length of paper of the plurality of next print jobs to be printed, and if the current remaining length is not greater than or equal to the current total length of paper of the plurality of next print jobs to be printed then comparing, in ascending order of remaining sheet length, the first and second remaining sheet lengths with the current total length of paper of the plurality of next print jobs to be printed and selecting one of the first paper roll and the second paper roll having a length of paper that is greater than or equal to the current total length of paper as the selected paper roll, based on the current total length of paper, and the first remaining length, and the second remaining length; and displaying, if the priority information indicates to process print jobs according to user selection, (i) print jobs among the plurality of print jobs having total lengths of paper which is less than or equal to the current remaining length of paper, the total lengths of paper, and a current remaining length of paper in the current paper roll and (ii) receiving a selection of a print job among the displayed print jobs for print processing using the current paper roll.

* * * * *